United States Patent
Giselmo et al.

(10) Patent No.: US 9,932,848 B2
(45) Date of Patent: Apr. 3, 2018

(54) PRESSURIZED SEAL SYSTEM FOR A POWER TURBINE UNIT

(71) Applicant: VOLVO TRUCK CORPORATION, Göteborg (SE)

(72) Inventors: Kent Giselmo, Vellinge (SE); Magnus Ekstrand, Svedala (SE); Lars Sundin, Malmö (SE); Sebastian Krausche, Höllviken (SE)

(73) Assignee: Volvo Truck Corporation, Göteborg (SE)

( * ) Notice: Subject to any disclaimer, the term of this patent is extended or adjusted under 35 U.S.C. 154(b) by 260 days.

(21) Appl. No.: 14/438,619

(22) PCT Filed: Nov. 21, 2012

(86) PCT No.: PCT/EP2012/004819
§ 371 (c)(1),
(2) Date: Apr. 25, 2015

(87) PCT Pub. No.: WO2014/079466
PCT Pub. Date: May 30, 2014

(65) Prior Publication Data
US 2015/0292345 A1    Oct. 15, 2015

(51) Int. Cl.
*F01D 25/22* (2006.01)
*F01D 11/04* (2006.01)
(Continued)

(52) U.S. Cl.
CPC .............. *F01D 11/04* (2013.01); *F01D 25/22* (2013.01); *F01D 25/30* (2013.01); *F02C 6/12* (2013.01)

(58) Field of Classification Search
None
See application file for complete search history.

(56) References Cited

U.S. PATENT DOCUMENTS

| 3,728,857 A | 4/1973 | Nichols |
| 2006/0034683 A1 * | 2/2006 | Elpern ................. F01D 17/141 415/191 |

(Continued)

FOREIGN PATENT DOCUMENTS

| DE | 102005047216 A1 * | 4/2007 | ............. F01D 15/02 |
| EP | 1092839 A1 * | 4/2001 | ........... F01D 25/183 |

(Continued)

OTHER PUBLICATIONS

International Search Report (dated Jul. 25, 2013) for corresponding International App. PCT/EP2012/004819.

(Continued)

*Primary Examiner* — Woody Lee, Jr.
*Assistant Examiner* — Theodore Ribadeneyra
(74) *Attorney, Agent, or Firm* — WRB-IP LLP

(57) ABSTRACT

A power turbine unit includes a turbine housing, an exhaust duct, a turbine wheel with blades positioned in the exhaust duct, a shaft rigidly connected to the turbine wheel and rotatably supported in the housing, and an oil sealing system. The oil sealing system includes a sealing arrangement positioned in the vicinity of the turbine wheel for preventing oil from escaping from the turbine housing along the shaft to the exhaust duct. The oil sealing system further includes a buffer gas duct that is arranged to supply exhaust gas from the exhaust duct to the sealing arrangement for pressurizing the sealing arrangement.

21 Claims, 4 Drawing Sheets

(51) Int. Cl.
*F02C 6/12* (2006.01)
*F01D 25/30* (2006.01)

(56) References Cited

U.S. PATENT DOCUMENTS

| | | | |
|---|---|---|---|
| 2006/0123795 A1* | 6/2006 | Fish | F01D 25/183 60/772 |
| 2006/0198727 A1* | 9/2006 | Arnold | F01D 9/026 415/169.1 |
| 2011/0164964 A1 | 7/2011 | Pakkala et al. | |
| 2012/0027569 A1* | 2/2012 | Purdey | F01D 11/00 415/1 |
| 2012/0201661 A1 | 8/2012 | Pandey et al. | |

FOREIGN PATENT DOCUMENTS

| | | | | |
|---|---|---|---|---|
| GB | 982085 A | * | 2/1965 | F01D 11/04 |
| GB | 2401912 A | * | 11/2004 | F01D 3/02 |

OTHER PUBLICATIONS

International Preliminary Report on Patentability (dated Sep. 9, 2014) for corresponding International App. PCT/EP2012/004819.

\* cited by examiner

PRESSURIZED SEAL SYSTEM FOR A POWER TURBINE UNIT

BACKGROUND AND SUMMARY

This invention relates to a power turbine unit comprising a turbine housing, an exhaust duct, a turbine wheel with blades positioned in said exhaust duct, a shaft rigidly connected to said turbine wheel and rotatably supported m said housing, and an oil sealing system comprising a sealing arrangement positioned in the vicinity of the turbine wheel for preventing oil from escaping from said turbine housing along said shaft to said exhaust duct. The invention also relates to an internal combustion engine comprising such a power turbine unit. The power turbine unit according to the invention can advantageously be provided to all types of internal combustion engines, in particular large combustion engines, such as in heavy trucks, buses and constructional vehicles.

It is known for example from document DE 10 2005 047 216 A1 to seal the turbine shaft by means of pressurised air. The pressurised air is supplied to a region of the shaft that is axially delimited by two sealing elements. This solution is relatively complex, and it requires reliable and constant supply of pressure controlled air from an air compressor, as well as two high performance sealing elements. There is thus a need for a simplified sealing arrangement fin a power turbine unit, where the above mentioned disadvantages are removed.

It is desirable to provide an inventive power turbine unit where the previously mentioned problems are at least partly avoided. The invention concerns, according to an aspect thereof, a power turbine unit comprising a turbine housing, an exhaust duct, a turbine wheel with blades positioned in said exhaust duct, a shaft rigidly connected to said turbine wheel and rotatably supported in said housing, and an oil sealing system comprising a sealing arrangement positioned in the vicinity of the turbine wheel for preventing oil from escaping from said turbine housing along said shaft to said exhaust duct.

An aspect of the invention is characterized in that said oil sealing system comprises a buffer gas duct that is arranged to supply exhaust gas from said exhaust duct to said sealing arrangement for pressurizing said sealing arrangement.

The inventive solution results, according to aspects thereof, in many advantages over the prior art. Most important, it does not require any pressurised air to be supplied from an external air compressor or the like. As a result, no active air flow and pressure control is required, no air supply tubes are required, and less pressurised air is required, thereby reducing fuel consumption and cost. The inventive solution, according to aspects thereof, is self-sustained and as such more reliable and allows simplified assembly of the engine.

Further advantages are achieved according to aspects thereof. For example, the buffer gas duct may be formed partly of an outer buffer gas duct wall separate from said housing. This design allows the outer buffer gas duct wall to operate at a higher temperature than the turbine housing temperature. The turbine housing has relatively good thermal connection to other parts of the engine in which the power turbine is arranged to be installed. For example, the turbine housing may be rigidly connected to a fluid coupling for transmitting the rotary power of the power turbine to for example an engine output shaft. This results in a cooling effect on the turbine housing. Furthermore, the lubricating oil within the engine also has a cooling effect on the turbine housing. When hot exhaust gas contacts the relatively cool turbine housing, soot and particles deposit on the cool surface and this may be a problem if the turbine housing forms a buffer gas duct wall. By forming the buffer gas duct partly of an outer buffer gas duct wall hat is separate from the turbine housing, the outer buffer gas duct wall may with proper installation attain a higher temperature than the turbine housing temperature such that less soot and particles of the exhaust flow will deposit on the surface of the outer buffer gas duct wall and more soot and particles will burn off when exhaust temperature is high.

Moreover, the buffer gas duct may be formed partly of an outer buffer gas duct wall and an inner buffer gas duct wall, each of which being separate from said housing. As described above, the separate inner and outer buffer gas duct walls allows higher duct wall temperature, thereby reducing soot and particles deposition on the inner walls of the buffer gas duct.

Furthermore, the buffer gas duct may be formed by at least an outer buffer as duct wall that is fastened to said housing by means of a fastener, or the buffer gas duct may be formed of said outer buffer gas duct wall and an inner buffer gas duct wall, each of which being fastened to said housing by means of a fastener. As described above, the inner and/or outer buffer gas ducts walls may result in higher temperature of the walls of the buffer gas duct, thereby reducing the trapped and contaminated inside of the buffer gas duct.

Furthermore, the outer buffer gas duct wall may form an inner wall of said exhaust duct. The dual function of the outer buffer has duct wall as buffer gas duct wall and exhaust gas wall results in a higher temperature of the outer buffer gas duct wall and allows simple and straightforward inlet of high pressure and high temperature exhaust has to the buffer gas duct for supply thereof to the sealing arrangement.

Furthermore, the inner and/or outer buffer gas duct wall may be formed of sheet metal. Sheet metal generally exhibits high thermal conductivity, high thermal form stability, and relatively cost-effective manufacturing processes.

Furthermore, the inner and/or outer buffer gas duct wall may be at least partly formed of an annular conical sleeve section that surrounds said shaft. The annular conical sleeve defines at least partly a buffer gas duct having a large flow area, such that internal fluid dynamic losses are reduced, and sufficient bailer gas flow is accomplished.

Furthermore, the buffer gas duct may be thermally insulated from said housing. Thereby the cooling effect of the housing, is reduced and the buffer gas duct walls may reach higher operating temperatures, and consequently reduced soot and particles deposition.

Furthermore, the thermal insulation may be partly formed by an air gap and/or insulation material having a low thermal conductivity, which thermal insulation is arranged between the buffer gas duct and said housing.

Furthermore, the thermal insulation may be partly realised by providing said fastener in at least one axial end region of said buffer gas duct, and specifically only in one axial end region of said buffer gas duct. The fasteners of the buffer gas duct potentially results in increased thermal coupling between the housing and buffer gas duct walls, thereby reducing the operating temperature of said walls. By providing fasteners in axial end regions, a minimum amount of fasteners is required to securely fasten the buffer gas duct walls to the housing.

Furthermore, said thermal insulation may be partly realised by insulation material provided between at least part of said fastener and said inner and/or outer buffer gas duct walls. This design further reduces the cooling effect of the housing.

Furthermore, said fastener may be engaged in a hole or recess in said inner and/or outer buffer gas duct walls. This design allows cost-effective manufacturing of the buffer gas duct walls.

Furthermore, said outer buffer gas duct wall may have a first section forming part of said exhaust duct, and a second section extending radially inwardly towards said shaft. This design allows the outer buffer gas duct wall itself to guide the exhaust gas directly to the sealing arrangement without the need for any intermediate gas guiding means, such as pipes etc.

Furthermore, said sealing arrangement may comprise a first sealing section and a second sealing section, said first sealing section being axially displaced from said second sealing section, and said buffer gas duct is arranged to supply exhaust gas to an annular cavity that is axially delimited by said first and second sealing sections. The first and second sealing sections are configured to deliver a flow of exhaust gas past the first sealing section and into the engine, but without feeding an excessive amount of high pressure exhaust into the engine. The flow of exhaust gas past the first sealing section and into the engine is caused by the pressure difference between the annular cavity of the sealing arrangement and the inside of the engine, i.e. the pressure within the crankcase housing, also referred to as engine blow-by pressure. When this pressure difference is positive, a flow of exhaust gas past the first sealing section will occur, thereby effectively preventing any leakage of oil out through the sealing arrangement. Too high flow is however negative since it requires increased crankcase ventilation. The second sealing section is preferably arranged to completely prevent exhaust gas from escaping the annular cavity past the second sealing section and out into the exhaust stream, but in practice such a flow of exhaust gas will nearly always occur.

Furthermore, said second sealing section is defined partly by said outer buffer gas duct wall.

Furthermore, said second sealing section is defined partly by at least one radial projection arranged on said shaft. A radial projection arranged on the shaft may in cooperation with an opposing counter-surface form a labyrinth seal that enables a sufficient sealing performance in a cost-effective and simple manner. Due to the lack additional separate external sealing rings, or the like, this solution is also particularly robust and maintenance-free.

Furthermore, at least one exhaust gas inlet may be provided in a wall of said exhaust duct for conveying exhaust gas from said exhaust duct into said buffer gas duct. This arrangement has the advantage of providing hot exhaust gas with sufficient pressure to the buffer gas duct without the need for additional components. Advantageously, the at least one exhaust gas inlet may be provided directly in the outer buffer gas duct wall. This simplifies manufacturing of the power turbine unit, and enables hot pressurised exhaust gas to directly enter the buffer gas duct upon passing through the exhaust gas inlet.

Furthermore, at least one exhaust gas inlet may be formed as a NACA inlet. This design allows good inlet flow of exhaust gas with low disturbance of the exhaust gas flow in the exhaust gas duct.

Furthermore, said exhaust duct may be a diffuser duct, and said at least one inlet may be arranged in a downstream region of said diffuser duct, where the exhaust gas static pressure is configured to be higher than in an upstream region of said diffuser duct. Increased exhaust gas static pressure means improved flow into the exhaust gas inlet in the exhaust gas duct, such that sufficient pressure may always be provided at the sealing arrangement to prevent oil leakage.

Furthermore, said at least one inlet may be arranged downstream of the turbine wheel in said exhaust duct. Arranging the inlet, downstream of the turbine wheel allows a shorter buffer gas duct; because the sealing arrangement is also arranged downstream the turbine wheel.

The invention also relates to an internal combustion engine comprising a turbo charger and a power turbine unit, wherein said power turbine unit is arranged downstream said turbo charger and connected to an engine crankshaft via fluid coupling and a gear train.

BRIEF DESCRIPTION OF DRAWINGS

In the detailed description of the invention given below reference is made to the following figure, in which.

DETAILED DESCRIPTION

Various aspects of the invention will hereinafter be described in conjunction with the appended drawings to illustrate and not to limit the invention, wherein like designations denote like elements, and variations of the inventive aspects are not restricted to the specifically shown embodiment, but are applicable on other variations of the invention.

Figure 1:
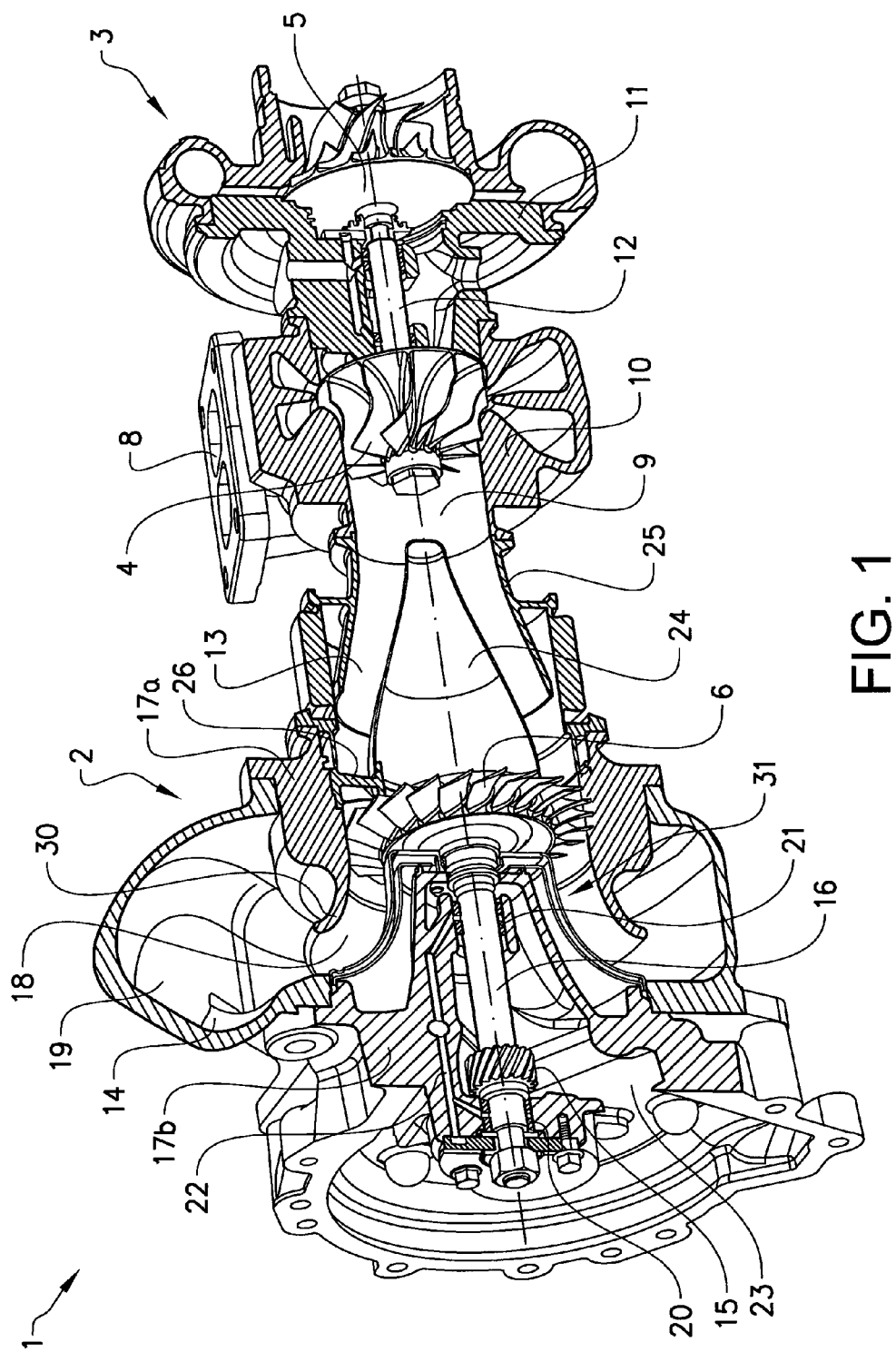
FIG. 1 shows an overview of a turbo compound unit having a power turbine unit according to the invention.

FIG. 1 shows an overview of a turbo compound unit 1 having a power turbine unit 2 according to the invention. The turbo compound unit 1 essentially comprises an upstream turbo charger 3 connected to a downstream power turbine unit 2. The turbo charger 3 comprises a turbo charger turbine 4 that is powered by exhaust gas from the combustion engine. The exhaust gas exhibits a first pressure and temperature drop between the exhaust gas inlet 8 and exhaust gas outlet 9 of the turbo charger 3, which pressure drop is converted by the turbo charger turbine wheel 4 into kinetic energy that is driving a turbo charger compressor wheel 5, which feeds compressed air to the engine. The turbo charger 3 is a conventional turbo charger with a turbine wheel housing 10, a compressor wheel housing 11, and a shaft 12 rotationally connecting, the turbine wheel 4 and the compressor wheel 5.

Exhaust gas leaving the outlet 9 of the turbo charger 3 is directed to an axial-flow turbine wheel 6 of the power turbine unit 2. The exhaust gas exhibits a second pressure and temperature drop between the inlet 13 and outlet 14 of the power turbine unit 2, which pressure drop is converted by the turbine wheel 6 mw kinetic energy that is supplied to the engine crankshaft via a rotational shaft 16, drive gear 15, gear train and a fluid coupling (not shown).

The power turbine unit 2 comprises a two-part turbine housing 17a, 17b, an exhaust duct 18 for conveying exhaust gas from the inlet 13 to an annular collector portion 19, a turbine wheel 6 with blades positioned in the exhaust duct 18, a shaft 16 rigidly connected to the turbine wheel 6 and rotatably supported in the housing 17b by means of slide bearings 20, 21. Lubrication oil channels 22 are provided in the housing 17*b* for feeding lubrication oil to the slide bearings 20, 21, and the hollow inside 23 of the housing 17*b* is connected to the wet sump lubrication system of the combustion engine.

Exhaust gas entering the inlet 13 of the power turbine unit 2 from the turbo charger 3 is first guided by a domed nozzle 24 and correspondingly formed outer annular wall 25 towards a stationary annular vane array 26 located upstream the turbine wheel 6. The exhaust gas then passes the blades of the turbine wheel 6, which blades are shaped such that the turbine wheel is caused to rotate. After having past the turbine wheel 6 and upon getting closer to the annular collector portion 19, the exhaust gas flow velocity decreases a certain degree, and the static exhaust gas pressure increases correspondingly.

The exhaust duct conveying the exhaust gas from the turbine wheel 6 to the annular collector portion 19 is formed of an outer and inner annular sleeve portions 30, 31 that have a trunco-conical curved shape, or a bell-mouthed shape, such that exhaust gas flow 61 may be efficiently redirected from an axial flow direction when passing the turbine wheel 6 to a more radial flow direction upon entering annular collector portion 19, all by eliminating losses as far as possible. The inner sleeve portion 31 has many functions. It functions as guiding wall for the exhaust gas. It also functions as heat shield for preventing the housing 17*b*, bearings 20, 21 and lubrication oil from excessive heating due to the hot exhaust gases. Moreover, it also functions as a buffer gas duct, as will be explained more in detail below.

Figure 2:
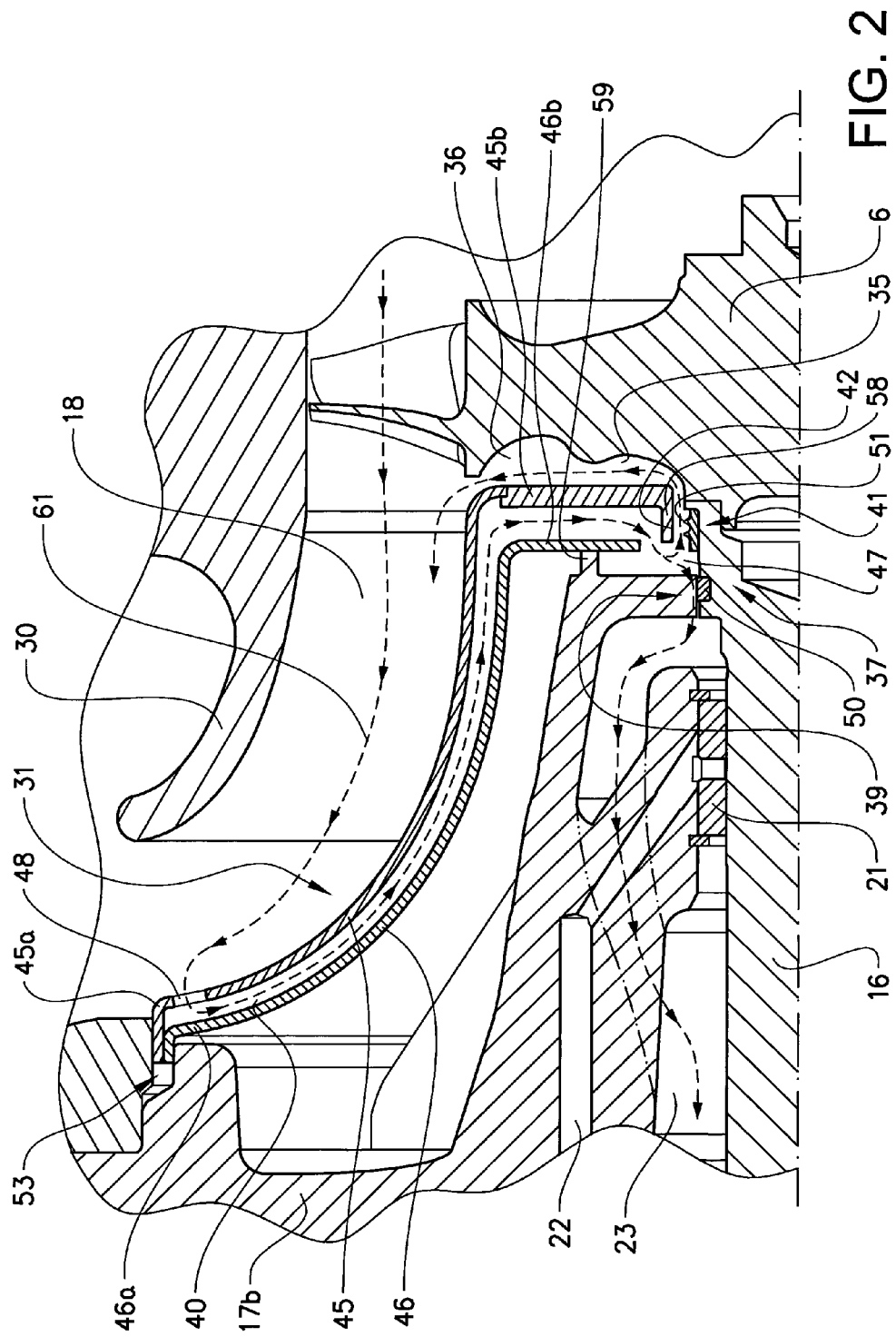
FIG. 2 shows a closer view of the power turbine unit of FIG. 1.

As show more in detail in FIG. 2, the power turbine unit comprises an oil sealing system with a sealing arrangement 37 positioned in the vicinity of the turbine wheel 6 for preventing lubrication oil from escaping from the inside 23 of the turbine housing 17*b* along the shaft 16 into the exhaust gas stream, which passes axially past the turbine wheel 6. The turbine wheel 6 rotates with a significant speed, for example up to about 50 000 rpm, thereby generating a reduced exhaust gas pressure at a radially inner region 35 of the turbine wheel 6 compared to the exhaust gas pressure at an outer region 36 of the turbine wheel 6. This difference is exhaust has pressure is caused partly by centrifugal forces acting on the exhaust gas located close the turbine wheel 6. At the same time, the oil mist pressure at the inner side 23 of the housing 17*b* varies with oil pump operation and is during certain operating conditions higher than the exhaust gas pressure at the inner region 35 of the turbine wheel 6. This pressure difference may generate an oil leakage out from the inside 23 of the housing 17*b* into the exhaust gas stream. The leaked oil then mix with the exhaust gas causing increased emissions, increased lubrication oil consumption, poisoning of the exhaust aftertreatment system. The oil leakage may also result in unwanted lubrication oil coke deposition at the first and second sealing sections 39, 41.

The oil sealing system comprises a buffer gas duct 40 that is arranged to supply exhaust gas from the exhaust duct 18 to the sealing arrangement 37 for pressurizing the sealing arrangement 37. The pressurisation of the sealing arrangement 37 is provided by supplying pressurised exhaust gas via the buffer gas duct 40. A pressurized sealing, arrangement that has a pressure above the oil mist pressure at the inner side 23 of the housing 17*b* effectively prevents any oil leakage along the shaft 16. Oil leakage may however still occur during certain operating conditions, such as during low engine load in combination with high turbine wheel speed, because at this operating condition the pressure within the sealing arrangement 37 and at said inner region 35 may be insufficient, i.e. lower than the pressure within the housing 17*b*.

The inner sleeve portion 31 is formed of an outer buffer gas duct wall 45 and an inner buffer gas duct wall 46 which extends essentially parallel to the outer buffer gas duct wall 45. The inner and outer buffer gas duct walls 45, 46 jointly define the annular buffer gas duct 40. The inner and outer buffer gas ducts walls 45, 46 are made of sheet steel, or similar suitable metal alloy and are secured to the housing 17*b* by means of at least one fastener. The inner and outer buffer gas duct walls 45, 46 are thus individual parts separate from the housing 17*a*, 17*b*.

The inner and outer buffer gas ducts walls 45, 46 further comprises a first section 45*a*, 46*a* forming the inner sleeve portion 31, and a second section 45*b*, 46*b* extending radially inwardly towards the shaft 16. The second section 45*b*, 46*b* extends from a front part of the sleeve portion 31, adjacent the turbine wheel 6. The second section 45*b*, 46*b* extends more or less in plane perpendicular to axis of the shaft 16. The annular buffer gas duct 40 formed by the inner and outer buffer gas ducts walls 45, 46 consequently extends from an inlet 48 in said first section 45*a* 46*a* to a region of said second section 45*b*, 46*b* located close the outer surface of the shaft 16.

The inner sleeve portion 31 functions as a buffer gas duct tier conveying high-pressure exhaust gas to an annular cavity 47, which is axially delimited by a first and second sealing sections 39, 41 and radially inwardly delimited by the shaft 16. The first and second sealing sections 39, 41 interact with the supplied high-pressure exhaust gas flow 61 for providing a desired elevated exhaust gas pressure in the annular cavity 47 that is located close to the turbine wheel 6. The annular cavity 47 thus forms a high-pressure region that generates an exhaust gas flow past the first sealing section 39 and into the housing. 17*b*, and thereby efficiently prevents leakage out via the shaft 6. This exhaust gas may by ventilated from the engine for example by means of an existing crankcase ventilation system.

During operating conditions with a relatively low exhaust pressure at the inner region 35 of the turbine wheel 6, such as low output power and high engine speed conditions that cause high centrifugal forces, a certain amount of exhaust gas will escape from the annular cavity 47 past the second sealing section 41, out into said inner region 35 of the turbine wheel 6, and subsequently back into the exhaust gas stream 61. A certain amount of the high-pressure exhaust gas will also escape from the annular cavity 47 via the first sealing section 39 and into the inside 23 the housing 17*b*. The amount of exhaust gas flowing past the first and section sealing, sections 39, 41 respectively depends on many variables and operating conditions, and may for example be about 50/50. The exhaust gas inlet 48, the buffer gas duct 40, the first and second sealing sections 39, 41 are all selected and dimensioned such as to provide a sufficient exhaust gas flow past the first sealing section 39 and into the housing 17*b* to prevent or at least reduce leakage past the sealing arrangement, but also such as to prevent excessive feeding of exhaust gas into the housing 17*b*.

The first sealing section 39 may comprise two stationary static sealing members in form of double piston rings arrangement installed, between the rotational shaft 16 and housing 17*b*. The piston rings 50 may be arranged in a groove in the outer surface of the shaft 16 for preventing that the piston rings 50 from being axially displaced when high pressure differences exists between the pressure in the annular cavity 47 and inside 23 the housing 17*b*. The piston rings 50 are dimensioned to exert a clamping pressure to the inner wall of the housing 17b, and the exhaust gas flow past the piston rings 50 will consequently flow between each separate piston ring 50 and the bottom wall of the associated groove in the shaft 16.

The second sealing section 41 may comprise one or more circumferentially extending radially protruding projections 51 provided on the shaft 16 in the area of the second sealing section 41. The circumferentially extending projections 51 may be in the form of one or more discrete rings. The projections 51 may be formed directly in the outer surface of the shaft 16, or on a separate member that is mounted on the shaft, as illustrated in FIG. 2. The projections may cooperate with an axial projection 58 of the second section 45b of the outer buffer gas duct wall 45 to form a robust non-contact labyrinth type sealing section. Many other sealing configurations may be used for the first and second sealing sections 39, 41. For example, both the first and/or second sealing sections 39, 41 may be of a single or double piston ring sealing type, or a labyrinth sealing type.

According to one aspect, an aim is to reduce the level of soot being accumulated and trapped in the circulating passage of exhaust gas previously described. Especially combustion engines using diesel fuel may at certain operating modes generate a large amount of soot particles, which may clog and block the exhaust gas circulating passage through the buffer gas duct 40. The power turbine unit 2 attempts to reduce the likeliness of trapped soot by a design that allows the walls 45, 46 of the buffer gas duct 40 to reach and maintain a very high temperature. It is believed that the high temperature of the walls of the buffer gas duct 40 reduces soot accumulation and clogging due to reduced adherence of the soot particles to the walls 45, 46. By providing both the inner and outer buffer gas duct walls 45, 46 as individual members, separated from the housing 17b, the cooling effect of the housing 17b is reduced and the inner and outer buffer gas duct walls 45, 46 may reach a higher continuous operating temperature. If the buffer gas duct 40 instead would have been formed by a passage within the housing itself, or the housing would have formed an inner buffer gas duct wall, than these buffer gas duct walls would have exhibited a lower operating temperature due to the cooling effect of the housing 17b, which has a good heat transfer to other large stationary housing parts of the engine, as well as cooled oil within the housing 17b.

Provisions are consequently provided to reduce the heat transfer capacity between the inner and outer buffer gas duct wall 45, 46 and the housing 17b. A first provision is a low heat transfer mounting of the inner and outer buffer as duct walls 45, 46. This is achieved by minimising the number and area of contact points between said walls 45, 46 and the housing 17b, as well as using spacers made of heat isolating materials for accomplishing a gap between the inner buffer gas duct wall 46 and housing 17b. The first section 45a, 46a of the buffer gas duct walls 45, 46 have preferably only one contact area 53 with the housing 17b. This contact area is preferably minimized and may be peripherally continuous or discrete.

The second section 45b, 46b of the inner and outer buffer gas duct walls 45, 46, is provided with apertures 53, 60 for receiving axially extending threaded fasteners 49 that engage threaded boles in the housing 17b, whereby a heat isolating first spacer 59 is provided between the second section of the inner buffer gas duct wall 46b and the housing 17b for ensuring a certain gap therebetween. Sonic spacing means is also required between the inner and outer buffer vas duct wall 45b, 46b for keeping the buffer gas duct 40 open upon tightening of the threaded fasteners.

Alternatively, or in addition, thermal insulation of the buffer gas duct walls 45, 46 partly formed by an insulation material having a low thermal conductivity may be arranged between the inner buffer vas duct wall 46 and the housing 17b.

The exhaust gas inlet 48 in the outer buffer gas duct wall 45 may have many different forms. Important aspects here are sufficient supply of exhaust gas into the buffer gas duct 40 and low levels of flow losses to the exhaust gas stream 61. The inlet 48 may for example be formed as a NACA inlet for allowing sufficient supply of exhaust gas into the buffer gas duct 40 while enabling a low distortion on the exhaust gas flow 61 past the inner sleeve portion 31. The size, shape location and number of inlets may vary according the needs of each specific installation. The at least one inlet 48 is arranged downstream of the turbine wheel 6 in the exhaust duct.

The inlet 48 is preferably located relatively dose to the downstream end of the inner sleeve portion 31, in the region where the axial exhaust gas flow 61 is redirected into an annular gas flow with much lower speed. The static gas pressure is configured to be higher in the downstream end of the inner sleeve portion 31 than in a more upstream location, mainly due to a higher gas velocity in the upstream region of the exhaust gas duct than a downstream region. The exhaust duct 18 is also referred to as a diffuser duct.

Figure 3:
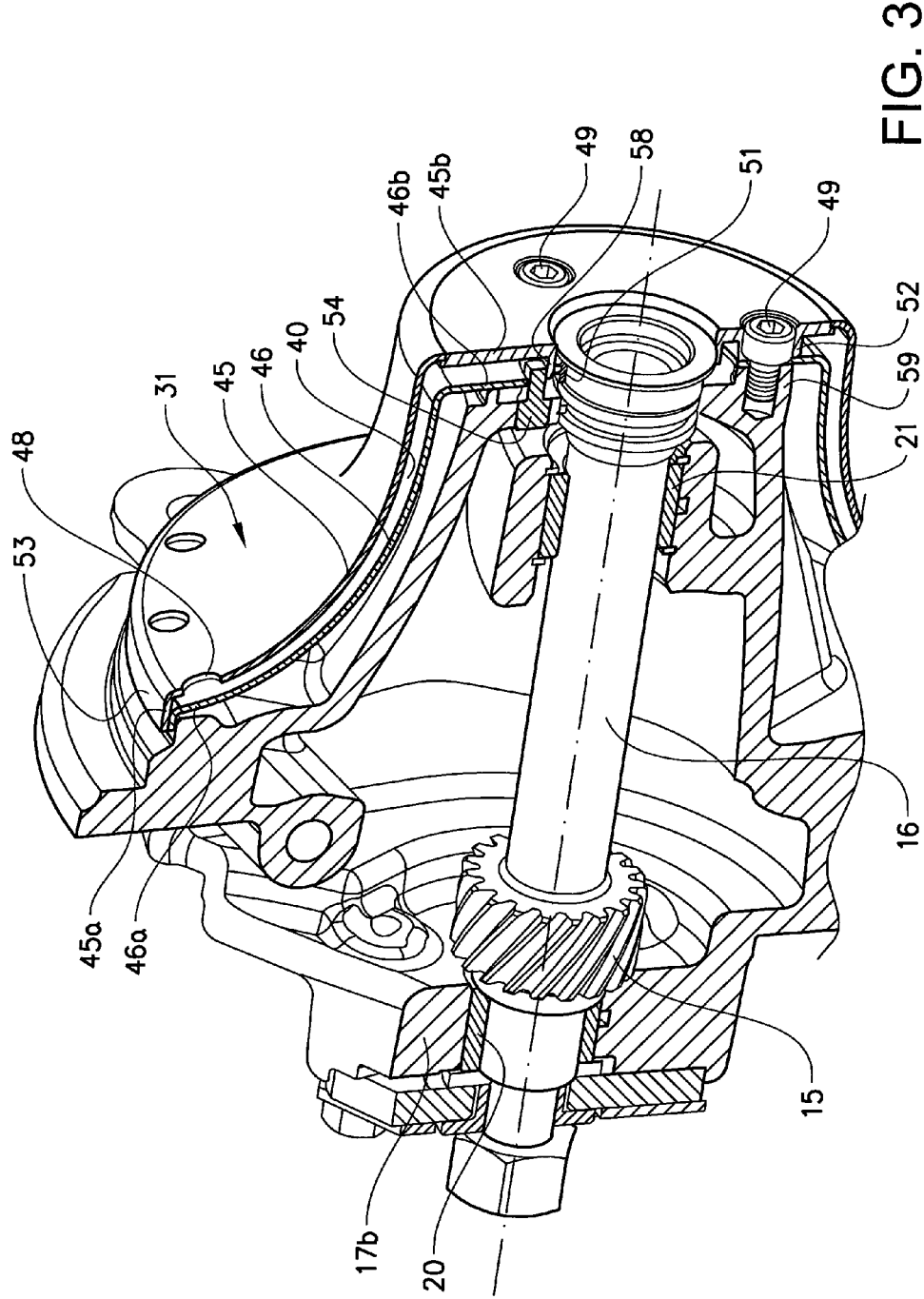
FIG. 3 shows a perspective view of the power turbine unit of FIG. 1.
Figure 4:
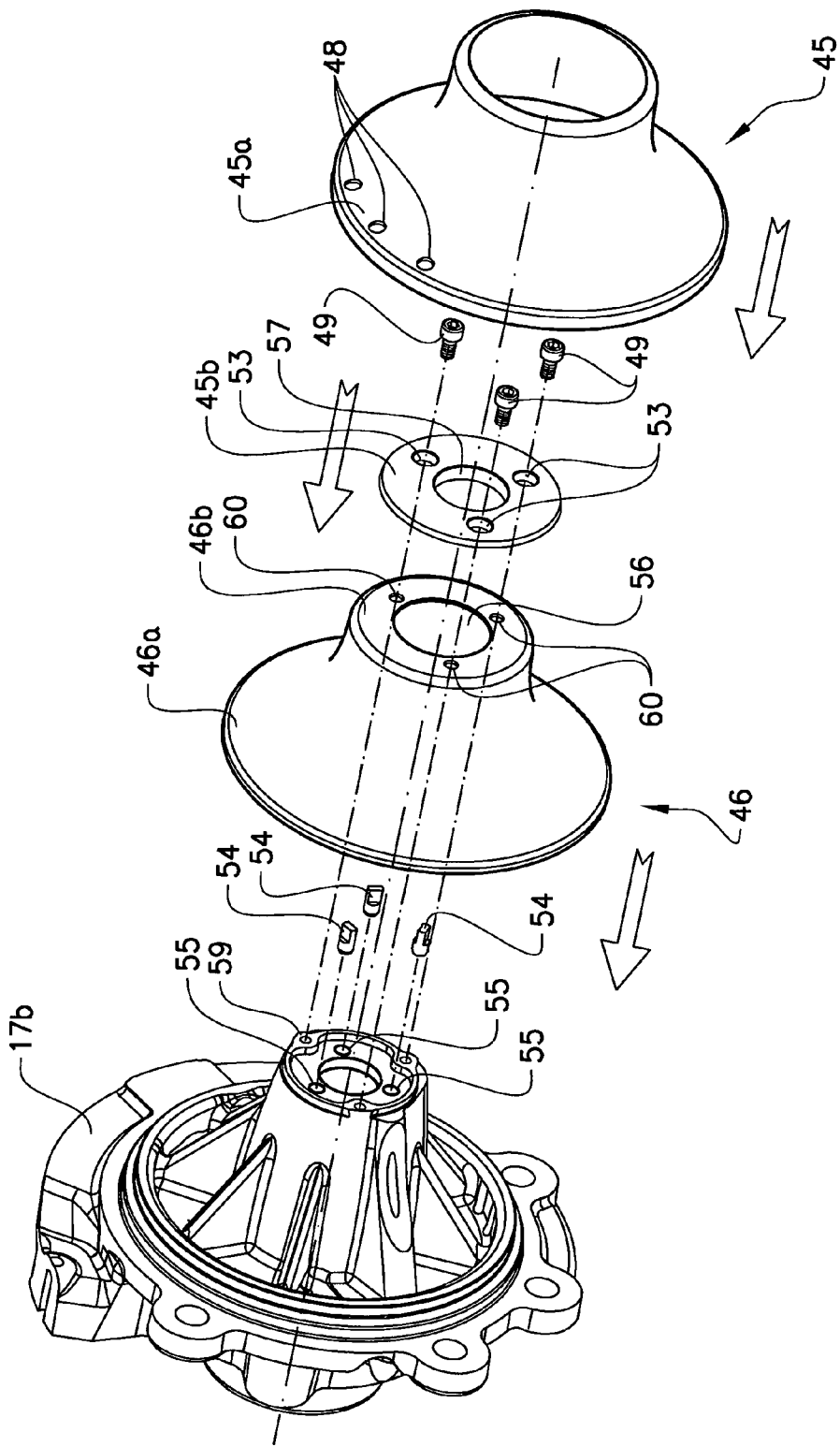
FIG. 4 shows an exploded view of the buffer gas duct walls of FIG. 1

FIG. 3 and FIG. 4 shows more in detail the configuration and shape of the inner sleeve portion 31, and its assembly with the housing 17b. As already mentioned, the inner and outer buffer gas duct walls 45, 46 are arranged slightly spaced apart. to form the buffer gas duct 40, which is configured to convey exhaust gas flow into the annular cavity 47. The inner sleeve portion 31 serves to redirect the more or less axial exhaust as flow leaving the turbine wheel 6 into an annular gas flow within the annular collector portion 19. The inner and outer buffer gas duet walls 45, 46 exhibit a truncated conical annular shape. The inner and outer gas duct walls 45, 46 are preferably fastened to the housing 17b by means of threaded members 49. Each of the inner and outer buffer gas duct walls 45, 46 may be formed as a single piece, or assembled from a plurality of pieces. In the disclosed embodiment, the inner buffer gas duct wall 46 is formed as a single piece, whereas the outer buffer gas duct walls 45 is formed of two members 45, 45b, namely a curved annular wall 45 and a flat disc 45b. These two parts are joined to each other by means of press fitting, welding, soldering, mechanical clamping, adhesive, or any other similar method. Forming the second section 45b of the outer buffer gas duct wall 45 as a separate flat disc has the advantage of enabling a more rigid disc but keeping a thin a light outer buffer gas duct wall, simplified manufacturing. and reduced cost.

The threaded members 49 are arranged to pass through the inner and outer buffer gas duct walls 45, 46 and to clamp these against a wall of the housing 17b. A first spacer 59 is preferably arranged between the inner buffer gas duct walls 46 and housing 17b to reduced heat losses due to thermal convection from the wall 46 to the housing 17b. The outer buffer gas duct walls 45 must be offset from the inner buffer gas duct wall 46 for forming the butler gas duct 40. This offset may be integrally formed in the second section 45b of the outer buffer gas duct wall 45, for example by a thawing process having a shape transformation process with material retention. In FIG. 3, the circular area surrounding each fastening hole 53 is drawn to form an outer spacer 52 that can abut the second section of the inner buffer gas duct wall 46b.

Three radial steering pins 54 are also shown in FIGS. 3 and 4, which steering pins 54 are located in axially extending apertures 55 in the housing 17b. The steering pins 54 serves to assure the correct radial position of the inner and outer buffer gas duct walls 45, 46, The inner buffer gas duct wall 46 has an axial circular opening 56 that fits over the three steering pins 54, and a projection 58 located at the radially inner portion of the second section 45b of the outer buffer gas duct wall 45 can be pushed in under the steering pins 54. A relatively high degree of accuracy with respect to the radial position of the second section 45b of the outer buffer gas duct wall 45 is advantageous for accomplishing a coaxial positioning of annular counter surface 42 with respect to the second sealing section 41 such that the correct internal pressure within the cavity 47 of the sealing arrangement 37 is accomplished.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims.

Accordingly, the drawings and the description thereto are to be regarded as illustrative in nature, and not restrictive.

The invention claimed is:

1. Power turbine unit comprising
a turbine housing,
an exhaust duct,
a turbine wheel with blades positioned in the exhaust duct,
a shaft rigidly connected to the turbine wheel and rotatably supported in the housing, and
an oil sealing system comprising a sealing arrangement positioned in the vicinity of the turbine wheel for preventing oil from escaping from the turbine housing along the shaft to the exhaust duct, wherein the oil sealing system comprises a buffer gas duct that is arranged to supply exhaust gas from the exhaust duct to the sealing arrangement for pressurizing the sealing arrangement, and
the buffer gas duct is formed partly by an outer buffer gas duct wall and an inner buffer gas duct wall, each of which being separate from the housing, wherein the buffer gas duct Is formed by at least an outer buffer gas duct wall, which is fastened to the housing by means of at least one fastener.

2. The power turbine unit according to claim 1, wherein the buffer gas duct is formed of the outer buffer gas duct wall and an inner buffer gas duct wall, each of which being fastened to the housing by means of at least one of the at least one fasteners.

3. The power turbine unit according to claim 1, wherein the outer buffer gas duct wall forms an inner wall of the exhaust duct.

4. The power turbine unit according to claim 1, wherein the inner and/or outer buffer gas duct wall is formed of sheet metal.

5. The power turbine unit according to claim 1, wherein the inner and/or outer buffer gas duct wall is at least partly formed of an annular conical sleeve section that surrounds the shaft.

6. The power turbine unit according to claim 1, wherein the buffer gas duct is thermally insulated from the housing.

7. The power turbine unit according to claim 6, wherein the thermal insulation is partly formed by an air gap between the buffer gas duct and the housing.

8. The power turbine unit according to claim 6, wherein the thermal insulation is at least partly formed by an insulation material having a low thermal conductivity being arranged between the buffer gas duct and the housing.

9. The power turbine unit according to claim 6, wherein the thermal insulation is partly realised by providing at least one of the at least one fasteners in at least one axial end region of the buffer gas duct, and specifically only in one axial end region of the buffer gas duct.

10. The power turbine unit according to claim 6, wherein the thermal insulation is partly realised by providing insulation material between at least part of at least one of the at least one fasteners and the inner and/or outer buffer gas duct walls.

11. The power turbine unit according to claim 1, wherein the at least one fastener is engaged in a hole in the housing.

12. The power turbine unit according to claim 1, wherein the at least one fastener is engaged in a hole or recess in the inner and/or outer buffer gas duct walls.

13. The power turbine unit according to claim 1, wherein the outer buffer gas duct wall have a first section forming part of the exhaust duct, and a second section extending radially inwardly towards the shaft.

14. The power turbine unit according to claim 1, wherein the sealing arrangement comprises a first sealing section and a second sealing section, the first sealing section being axially displaced from the second sealing section,
and the buffer gas duct is arranged to supply exhaust gas to an annular cavity that is axially delimited by the first and second sealing sections.

15. The power turbine unit according to claim 14, wherein the second sealing section is defined partly by the outer buffer gas duct wall.

16. The power turbine unit according to claim 14, wherein the second sealing section is defined partly by at least one radial projection arranged on the shaft.

17. The power turbine unit according to claim 1, wherein at least one exhaust gas inlet is provided in the exhaust duct for conveying exhaust gas from the exhaust duct into the buffer gas duct.

18. The power turbine unit according to claim 17, wherein at least one exhaust gas inlet is formed as a NACA inlet.

19. The power turbine unit according to claim 16, wherein the exhaust duct is a diffuser duct, and the at least one inlet is arranged in a downstream region of the diffuser duct, where the exhaust gas static pressure is configured to be higher than in an upstream region of the diffuser duct.

20. The power turbine unit according to claim 17, wherein the at least one inlet is arranged downstream of the turbine wheel in the exhaust duct.

21. Internal combustion engine comprising a turbo charger and a power turbine unit, the power turbine unit comprising
a turbine housing,
an exhaust duct,
a turbine wheel with blades positioned in the exhaust duct,
a shaft rigidly connected to the turbine wheel and rotatably supported in the housing, and
an oil sealing system comprising a sealing arrangement positioned in the vicinity of the turbine wheel for preventing oil from escaping from the turbine housing along the shaft to the exhaust duct, wherein the oil sealing system comprises a buffer gas duct that is arranged to supply exhaust gas from the exhaust duct to the sealing arrangement for pressurizing the sealing arrangement, and the buffer gas duct is formed partly by an outer buffer gas duct wall and an inner buffer gas duct wall, each of which being separate from the housing, wherein the power turbine unit is arranged downstream of the turbo charger and connected to an engine crankshaft via fluid coupling and a gear train.

* * * * *